(12) United States Patent
Tian et al.

(10) Patent No.: US 7,379,235 B2
(45) Date of Patent: May 27, 2008

(54) REDUCING POLARIZATION DEPENDENCE OF A WAVELENGTH DISPERSION VARIATION MONITOR

(75) Inventors: Cechan Tian, Plano, TX (US); Susumu Kinoshita, Plano, TX (US)

(73) Assignee: Fujitsu Limited, Kawasaki (JP)

( * ) Notice: Subject to any disclaimer, the term of this patent is extended or adjusted under 35 U.S.C. 154(b) by 153 days.

(21) Appl. No.: 11/084,504

(22) Filed: Mar. 18, 2005

(65) Prior Publication Data

US 2006/0250682 A1 Nov. 9, 2006

(51) Int. Cl.
*H01S 3/00* (2006.01)
(52) U.S. Cl. .................................. 359/337.5
(58) Field of Classification Search ............. 359/337.5
See application file for complete search history.

(56) References Cited

U.S. PATENT DOCUMENTS

| | | | |
|---|---|---|---|
| 6,271,952 B1* | 8/2001 | Epworth | 398/147 |
| 6,396,606 B1* | 5/2002 | Mao | 398/152 |
| 6,493,473 B1* | 12/2002 | Wooten | 385/11 |
| 6,738,181 B1* | 5/2004 | Nakamoto et al. | 359/337 |
| 6,829,440 B2* | 12/2004 | Ooi et al. | 398/148 |
| 6,999,688 B1* | 2/2006 | Hui et al. | 398/205 |
| 7,106,979 B1* | 9/2006 | Taylor | 398/209 |
| 2002/0118422 A1* | 8/2002 | Cao | 359/161 |
| 2003/0123776 A1* | 7/2003 | Koch et al. | 385/11 |
| 2003/0156776 A1* | 8/2003 | Han et al. | 385/11 |
| 2004/0095582 A1* | 5/2004 | Holbrook | 356/491 |
| 2004/0208618 A1* | 10/2004 | Roberts et al. | 398/158 |
| 2004/0208646 A1* | 10/2004 | Choudhary et al. | 398/188 |
| 2005/0078964 A1* | 4/2005 | Takahara et al. | 398/147 |
| 2005/0265727 A1* | 12/2005 | Glingener | 398/152 |
| 2006/0013592 A1* | 1/2006 | Isomura et al. | 398/152 |

OTHER PUBLICATIONS

Brida et al. Twin-Photon Techniques for Photo-Detector Calibration. Laser Physics Letters 3. (2006) 115. published May 2005.*
Ogawa et al. High-Sensitivity Pulse Spectrogram measurement using two-photon absroption in a semiconductor at a 1.5 micron wavelength. Jul. 31, 2000. Optics Express. vol. 7. No. 3.*
Gisen et al. Twin-Photon Techniques for Fiber Measurements. arXiv:quant-ph/9807063v122Jul1998.*

(Continued)

*Primary Examiner*—Deandra M Hughes
(74) *Attorney, Agent, or Firm*—Baker Botts L.L.P.

(57) ABSTRACT

Reducing polarization dependence of a dispersion variation monitor includes receiving an optical signal. The optical signal is split into a first polarized signal having first photons and a second polarized signal having second photons. The first photons are received at a first material of a first detector, where the first material is operable to produce a reaction in response to the arrival of a predetermined number of photons. The second photons are received at a second material of a second detector, where the second material is substantially similar to the first material. A first current produced by the first material in response to receiving the first photons and a second current produced by the second material in response to receiving the second photons are monitored. Whether there is wavelength dispersion variation among the plurality of components is established in accordance with the first current and the second current.

19 Claims, 2 Drawing Sheets

OTHER PUBLICATIONS

Petersen, M.N., et al., "*Dispersion monitoring and compensation using a single in-band subcarrier tone*", © 2000 Optical Society of America, pp. WH4-1-WH4-3.

Pan, Z., et al., "*Chromatic dispersion monitoring and automated compensation for NRZ and RZ data using clock regeneration and fading without adding signaling*", © 2000 Optical Society of America, pp. WH5-1-WH5-3.

Nezam, S.M.R. Motaghian, et al., "*Chromatic Dispersion Monitoring Using Partial Optical Filtering and Phase-Shift Detection of Bit Rate and Doubled Half Bit Rate Frequency Components*", © 2004 Optical Society of America, 3 pages.

Bhandare, Suhas, et al., "*Fully automatic, tunable chromatic dispersion compensation at 40 Gbit/s in ASK and DPSK, NRZ and CSRZ, 263 km transmission experiments*", 15C1-4; Ninth Optoelectronics and Communications Conference, Third International Conference on Optical Internet (OECC/COIN2004), Technical Digest, Jul. 2004, 2 pages.

Kawasaki, Takeshi, et al., "*Adaptive Dispersion Compensation Experiment in 15×43Gbit/s 400km Transmission by a Simple Dispersion Monitoring Scheme utilizing the periodic frequency response of AWG*", Ninth Optoelectronics and Communications Conference, Third International Conference on Optical Internet (OECC/COIN2004), Technical Digest, Jul. 2004, 2 pages.

Hayashi, M., et al., "*All-Optical Chromatic Dispersion Monitor Using Optical Correlation with Cross Absorption Modulation Effect*", European Conference on Optical Communication, 2 pages, Sep. 2004.

Mohs, G., et al., "*Rapid dispersion compensation optimization without BER measurements*", European Conference on Optical Communication, 2 pages, Sep. 2004.

Patent Application entitled, "*Monitoring Wavelength Dispersion Variation Using Photon Absorption*", 28 pages specification, claims and abstract, 2 pages of drawings, inventors Cechan (nmi) Tian et al, Feb. 18, 2005.

\* cited by examiner

REDUCING POLARIZATION DEPENDENCE OF A WAVELENGTH DISPERSION VARIATION MONITOR

TECHNICAL FIELD

This invention relates generally to the field of optical networks and more specifically to reducing polarization dependence of a wavelength dispersion variation monitor.

BACKGROUND

A communication network may communicate information using optical signals transmitted as light pulses. Certain devices of a communication network may yield results that are undesirably dependent on the polarization of the signals.

Known techniques for reducing polarization dependence include using polarization controllers to control the polarization of the signal. In wave division multiplexing (WDM) systems, however, the polarization of the signal is constantly changing and controlling the polarization of signals is complex. It is desirable to avoid complex solutions in certain situations.

SUMMARY OF THE DISCLOSURE

In accordance with the present invention, disadvantages and problems associated with previous techniques for reducing polarization dependence may be reduced or eliminated.

According to one embodiment of the present invention, reducing polarization dependence of a dispersion variation monitor includes receiving an optical signal. The optical signal is split into a first polarized signal having first photons and a second polarized signal having second photons. The first photons are received at a first material of a first detector, where the first material is operable to produce a reaction in response to the arrival of a predetermined number of photons. The second photons are received at a second material of a second detector, where the second material is substantially similar to the first material. A first current produced by the first material in response to receiving the first photons and a second current produced by the second material in response to receiving the second photons are monitored. Whether there is wavelength dispersion variation among the plurality of components is established in accordance with the first current and the second current.

Certain embodiments of the invention may provide one or more technical advantages. A technical advantage of one embodiment may be that a dispersion variation monitor monitors wavelength dispersion variation of a signal in accordance with photon absorption. The dispersion variation monitor includes polarization dependence reduction features that reduce polarization dependence. The features may split an optical signal into a first polarized signal having first photons and a second polarized signal having second photons. A first current produced by a first material in response to receiving the first photons and a second current produced by a second material in response to receiving the second photons are monitored. The features may reduce polarization dependence.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE DRAWINGS

Embodiments of the present invention and its advantages are best understood by referring to FIGS. 1 through 4 of the drawings, like numerals being used for like and corresponding parts of the various drawings.

Figure 1:
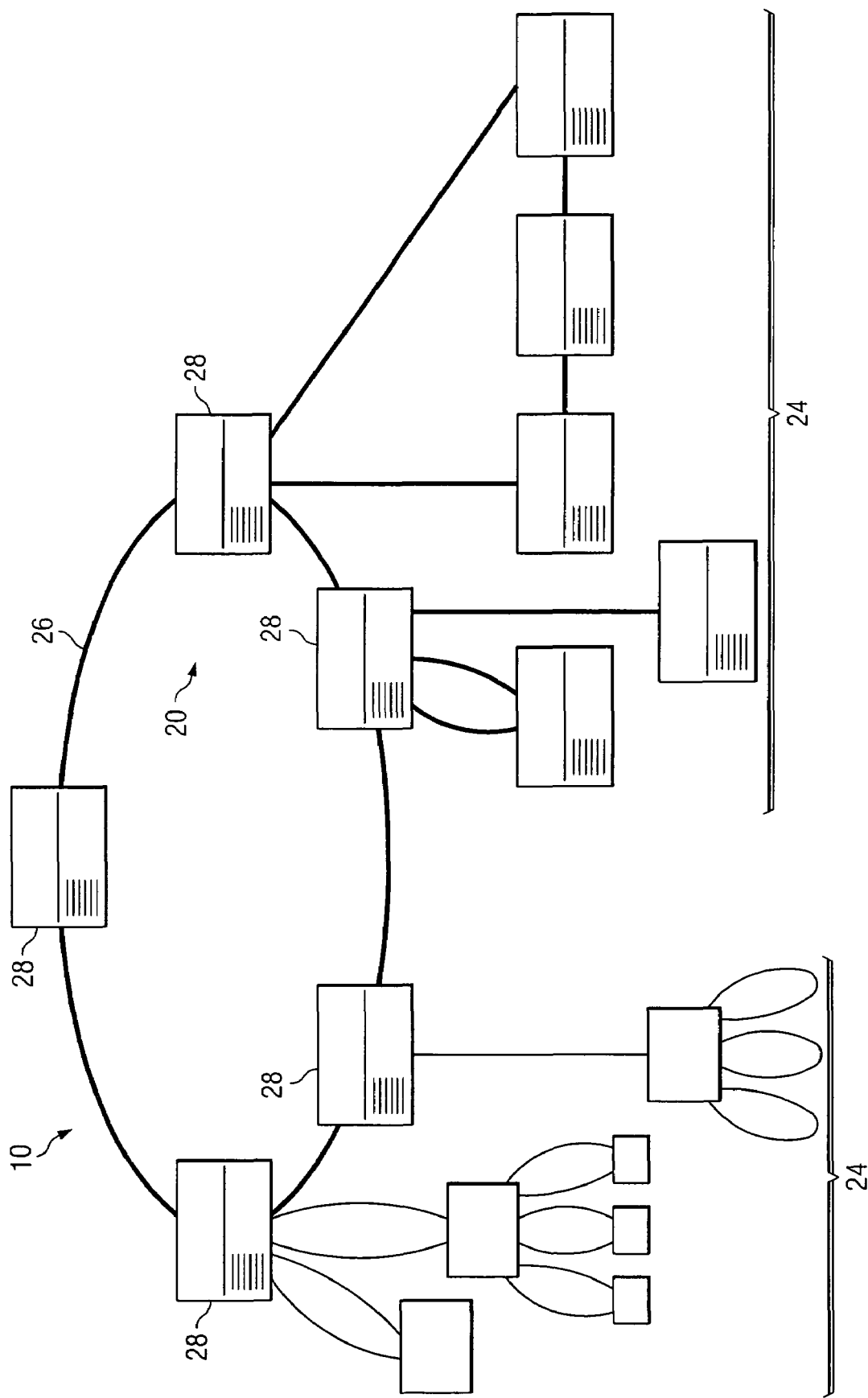
FIG. 1 is a block diagram illustrating one embodiment of a network that includes a node that has a dispersion variation monitor.

FIG. 1 is a block diagram illustrating one embodiment of a network 10 that includes a node that has a dispersion variation monitor that has reduced polarization dependence. According to the embodiment, the dispersion variation monitor monitors wavelength dispersion variation of a signal in accordance with photon absorption. The efficiency of photon absorption, however, is dependent on the polarization of the signal. Accordingly, the dispersion variation monitor includes polarization dependence reduction features that reduce, or even eliminate, polarization dependence.

According to the illustrated embodiment, network 10 communicates information through signals. A signal may refer to an optical signal transmitted as light pulses comprising photons. An optical signal may have a frequency of approximately 1550 nanometers, and a data rate of, for example, 10, 20, 40, or over 40 gigabits per second. A signal typically includes one or more components. A component may refer to a portion of light having a specific wavelength or wavelength range.

A component with a smaller wavelength travels through a material at a different speed than a component with a larger wavelength, so different components travel at different speeds, resulting in a spatial separation. Wavelength dispersion refers to the spatial separation resulting from the different speeds. Wavelength dispersion variation refers to a change in wavelength dispersion.

Wavelength dispersion changes the waveform shape of the pulses of a signal. As an example, when a pulse is transmitted, the waveform shape of the pulse may be narrow. As the pulse travels through a medium, the components of the pulse travel at different speeds, and the waveform shape of the pulse becomes wider.

Dispersion tolerance distance decreases in accordance with the square of the data rate. For example, for no return-to-zero (NRZ) modulation, the distance for a 10 gigabits per second signal is approximately 40 kilometers of single-mode fiber (SMF). For 40 gigabits per second, the distance is approximately 2.5 kilometers. Dispersion may cause problems for data rates over 10 gigabits per second, such as rates greater than 40 gigabits per second.

A signal may comprise any suitable signal, for example, a return-to-zero (RZ) signal, a carrier suppressed return-to-zero (CS-RZ) signal, a CS-RZ differential phase shifted keying (DPSK) signal, or a clock signal. A return-to-zero signal and a clock signal include carrier, blue side sub-carrier, red side sub-carrier, and other components.

A signal may communicate information in packets. A packet may comprise a bundle of data organized in a specific way for transmission, and a frame may comprise the payload of one or more packets organized in a specific way for transmission. A packet may carry any suitable information such as voice, data, audio, video, multimedia, other information, or any combination of the preceding. The packets may comprise any suitable multiplexed packets, such time division multiplexed (TDM) packets, communicated using any suitable protocol such as the Ethernet over synchronous optical network (SONET) protocol.

Network 10 includes a ring 20 coupled to access equipment 24 as shown. A ring may refer to a network of communication devices that has a ring topology. According to one embodiment, ring 20 may comprise an optical fiber ring. For example, ring 20 may comprise a resilient packet ring (RPR).

Ring 20 has nodes 28 coupled by fibers 26. A node may refer to a point of a ring at which packets may be communicated to another node. A node 28 may comprise, for example, a dense wavelength division multiplexer (DWDM). A node may include an adaptive dispersion compensation (ADC) device. An adaptive dispersion compensation device monitors dispersion variation, and compensates for the dispersion in accordance with the determination. The dispersion compensation device may use a dispersion compensator, such as a tunable dispersion compensator, to compensate for the dispersion.

The dispersion compensation device includes a dispersion variation monitor that monitors dispersion variation and instructs the dispersion compensator to compensate for the dispersion. The dispersion variation monitor may monitor wavelength dispersion variation in accordance with photon absorption. A technique for monitoring dispersion variation in accordance with photon absorption is described in more detail with reference to FIG. 2.

Figure 2:
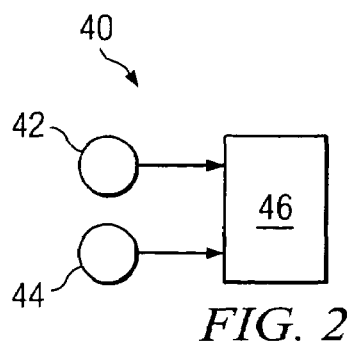
FIG. 2 is a diagram illustrating example photons arriving at one embodiment of a dispersion variation monitor.

FIG. 2 is a diagram 40 illustrating example photons 42 and 44 of an optical signal arriving at example dispersion variation material 46. The optical signal comprises a first component and a second component. The first component has a greater wavelength than that of the second component, so the first component travels at a different speed than that of the second component. Accordingly, the signal experiences wavelength dispersion.

The waveform shape of the pulses changes as a result of the wavelength dispersion. Typically, a wider waveform shape indicates more wavelength dispersion, and a narrower waveform shape indicates less wavelength dispersion. A pulse with a narrower waveform shape may include more photons that arrive at material 46 at the same time, and a pulse with a wider waveform shape may include fewer photons that arrive at material 46 at the same time.

Dispersion variation material 46 may comprise material that may produce a reaction when a predetermined number of photons arrive at substantially the same time at the material. According to the illustrated embodiment, material 46 reacts when two photons 42 and 44 arrive at the same time. More photons arriving at material 46 increases the probability that the predetermined number of photons arrive at substantially the same time, thus increasing the number of reactions. Since a pulse with a narrower waveform includes more photons that arrive at material 46 at the same time, a narrower waveform pulse may generate more reactions than a wider waveform pulse.

A dispersion variation monitor may monitor the reactions occurring at material 46. A change in the number of reactions may indicate dispersion variation. A dispersion variation monitor may use photon absorption to monitor dispersion variation, but the efficiency of two-photon absorption is dependent on the polarization of the light. The dispersion variation monitor may have polarization dependence reduction features that reduce the dependence on polarization. The features are described in more detail with reference to FIG. 3.

Moreover, the polarization reduction features may yield an efficiency comparable to that of linearly polarized light. Linearly polarized light is more efficient than elliptically polarized light, which is in turn more efficient than circularly polarized light. Polarized light may be represented by x-axis and y-axis projections of the electric field vector E(z,t) in the z-axis direction at time t. The x-axis and y-axis may be selected so that the axes overlap with the main axes of the ellipse, and the transverse components $E_x(z,t)$ and $E_y(z,t)$ may be given by Equations (1) and (2):

$$E_x(z,t) = E_{0x} \cos \phi \qquad (1)$$

$$E_y(z,t) = E_{0y} \sin \phi \qquad (2)$$

where $E_{0x} = E_0 \cos \phi$, $E_{0y} = E_0 \sin \theta$, $\theta$ represents the angle measured from the x-axis, and $\phi$ represents the phase of the x and y components.

If a signal is linearly polarized along the x-axis, then $\theta = m\Pi$, where m is an integer. If a signal is linearly polarized along the y-axis, then $\theta = (2m+1)\Pi/2$. If a signal is circularly polarized, then $\theta = (2m+1)\Pi/4$. The relative phase delay of the light at the two axes is $\Pi/2$.

The photon current resulting from two-photon absorption may be given by Equation (3):

$$I = aE_0^4 (5 + \cos 4\theta)/16 \qquad (3)$$

where a represents an efficiency factor, which is dependent on focusing and electrical circuit conditions. The photon current $I_{linear}$ for linearly polarized light may be given by Equation (4):

$$I_{linear} = 3aE_0^4/8 = 3aP_0^2/8 \qquad (4)$$

The photon current $I_{circular}$ for circularly polarized light may be given by Equation (5):

$$I_{circular} = aE_0^4/4 = aP_0^2/4 \qquad (5)$$

Therefore, linearly polarized light is 50% more efficient than circularly polarized light in generating a two-photon current.

Referring back to FIG. 1, fibers 26 may refer to any suitable fiber operable to transmit a signal. According to one embodiment, a fiber 26 may represent an optical fiber. An optical fiber typically comprises a cable made of silica glass or plastic. The cable may have an outer cladding material around an inner core. The inner core may have a slightly higher index of refraction than the outer cladding material. The refractive characteristics of the fiber operate to retain a light signal inside of the fiber.

Access equipment 24 may include any suitable device operable to communicate with nodes 28 of ring 20. Examples of access equipment 24 include access gateways, endpoints, softswitch servers, trunk gateways, networks, access service providers, Internet service providers, or other device operable to communicate with nodes 28 of ring 20.

Modifications, additions, or omissions may be made to network 10 without departing from the scope of the invention. The components of network 10 may be integrated or separated according to particular needs. Moreover, the operations of network 10 may be performed by more, fewer, or other devices. Additionally, operations of network 10 may be performed using any suitable logic. Logic may refer to hardware, software, or any combination of hardware and software. As used in this document, "each" refers to each member of a set or each member of a subset of a set.

Figure 3:
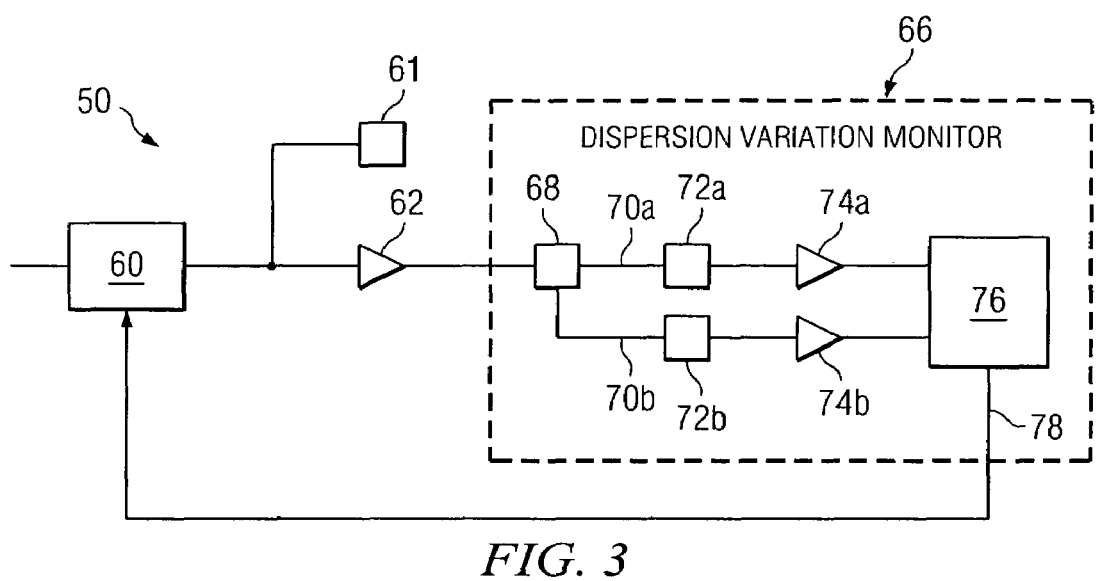
FIG. 3 is a block diagram illustrating one embodiment of a dispersion compensation system that may be used at a node of the network of FIG. 1.

FIG. 3 is a block diagram illustrating one embodiment of a dispersion compensation system 50 that may be used at node 28 of network 10 of FIG. 1. According to the illustrated embodiment, dispersion compensation system 50 includes a dispersion compensator 60, an optical receiver 61, an amplifier 62, and a dispersion variation monitor 66 coupled as shown.

In operation, dispersion compensator 60 receives an optical signal, and sends the signal to optical receiver 61 and amplifier 62. Amplifier 62 amplifies the optical signal. Dispersion variation monitor 66 monitors dispersion variation, and instructs dispersion compensator 60 to compensate for the dispersion in accordance with the dispersion variation. For an RZ signal, the monitoring accuracy may be greater than approximately 50 picoseconds per nanometer at 10 gigabits per second.

Dispersion compensator 60 compensates for dispersion of an optical signal, and may comprise, for example, a tunable dispersion compensator (TDC). According to one embodiment, dispersion compensator 60 receives an optical signal, and focuses the signal onto a diffraction grating. The grating separates the channels of the signal and spreads out the components of each channel. The components are then directed towards a phase adjuster that adjusts the phase of the components. As an example, a phase adjuster may comprise a microelectromechanical system (MEMS) that includes micromirrors. Each micromirror applies a phase adjustment to a component. Adjusted components are then combined at the diffraction grating.

Amplifier 62 amplifies the optical signal. Amplifier 62 may comprise an optical repeater that amplifies an optical signal without opto-electrical or electro-optical conversion. Amplifier 62 may comprise an optical fiber doped with a rare earth element. When a signal passes through the fiber, external energy is applied to excite the atoms of the doped portion of the optical fiber, which increases the intensity of the optical signal. As an example, amplifier 62 may comprise an erbium-doped fiber amplifier (EDFA).

Dispersion variation monitor 66 monitors dispersion variation and instructs dispersion compensator 60 to compensate for the dispersion in accordance with the variation. According to the illustrated embodiment, dispersion variation monitor 66 includes a polarization beam splitter 68, polarization maintaining fibers 70a-b, detectors 72a-b, amplifiers 74a-b, and a voltage monitor 76.

Polarization beam splitter 68 splits the signal into linearly polarized components $E_x(z,t)$ and $E_y(z,t)$ given by Equations (6) and (7):

$$E_x(z,t)=E_{0x} \cos \phi_x \quad (6)$$

$$E_y(z,t)=E_{0y} \sin \phi_y \quad (7)$$

where $\phi_i$ represents the phase of the i component. If the signal is linearly polarized, then $\phi_x=\phi_y$. If a signal is circularly polarized, then $\phi_x=\phi_y+(2m+1)\Pi/2$ and $E_{0x}=E_{0y}$, where m is an integer. Each component travels through a polarization maintaining fiber 70a-b, which maintains the polarization of each component.

Detectors 72a-b monitor dispersion variation of an optical signal. A detector 72 may comprise a material that may produce a reaction when a predetermined number of photons arrive at substantially the same time at substantially the same place of the material. For example, the material may release an electron when a predetermined number of photons arrive at substantially the same time at substantially the same place of the material. More photons arriving at the material increases the probability that the material will produce reactions. Substantially the same place may refer to the area in which the number of photons may arrive to produce the reaction. Substantially the same time may refer to the time period in which the number of photons may arrive to produce the reaction.

The material may be selected to respond to a predetermined number of photons. According to one embodiment, the material may be selected such that the band gap energy $E_g$ of the material may react to a number n of photons having photon energy hv. To detect n photons, a material with a band gap energy $E_g$ may be selected according to Equation (8):

$$(n-1)hv \leq E_g \leq nhv \quad (8)$$

For example, a material with an energy $E_g$ may be selected according to Equation (9) to detect two photons:

$$hv \leq E_g \leq 2hv \quad (9)$$

According to one embodiment, detector 72 may comprise a photodiode such as a silicon avalanche photodiode. A silicon avalanche photodiode comprises a semiconductor material such as silicon. Silicon may release an electron when two photons arrive at substantially the same time at substantially the same place. That is, two photons may generate one electron-hole pair. The photon current is proportional to the square of the input power.

A silicon avalanche photodiode internally amplifies a photocurrent by an avalanche process. When incident photons come into contact with an active region of the semiconductor material, electrons may be generated. A voltage may be applied across the active region to accelerate the electrons as they move through the active region. As the electrons collide with electrons of the semiconductor material, more electrons become part of the photocurrent, resulting in avalanche multiplication. Avalanche multiplication continues until the electrons move out of the active region.

The photon current in each direction is given by Equation (4). The relative phase of the signal in the x and y directions does not change the photon current in each direction, so the measured photon current $I_x$ in the x and the photon current $I_y$ in the y directions may be expressed by Equations (10) and (11):

$$I_x=3a_x P_{0x}^2/8=3aP_0^2/8 \cos^4\theta \quad (10)$$

$$I_y=3a_y P_{0y}^2/8=3aP_0^2/8 \sin^4\theta \quad (11)$$

A polarization independent normalized current I may be determined from currents $I_x$ and $I_y$ according to Equation (12):

$$I=I_x+I_y+2\sqrt{(I_x I_y)} \quad (12)$$

If efficiency factors $a_x=a_y=a$, then normalized current I may be expressed by Equation (13):

$$I = 3aP_0^2/8(\cos^4\theta + \sin^4\theta + 2\cos^2\theta\sin^2\theta) \quad (13)$$
$$= 3aP_0^2/8(\cos^2\theta + \sin^2\theta)^2$$
$$= 3aP_0^2/8$$

Normalized current I is independent of $\theta$ and $\phi$, and thus is independent of the polarization of the incoming light. Moreover, Equations (4) and (11) show that the normalization yields an efficiency similar to that resulting from linearly polarized light and detected by a single detector.

Equation (13) assumes that efficiency factors $a_x=a_y$. According to one embodiment, if the quantum conversion efficiencies of detectors 72a-b are not the same, amplifiers 74a-b may be used to compensate for the differences such that efficiency factors $a_x=a_y$. Amplifiers 74a-b amplify the output, such as an electrical current, received from detector 72. An amplifier 74 may comprise a low frequency electrical amplifier. According to the embodiment, amplifiers 74a-b may be calibrated to equalize the conversion efficiency. According to the embodiment, a calibrating signal may be input into dispersion monitor 66. A calibrating signal may refer to a signal that has scrambled polarization, and may comprise a white noise signal such as an amplifier spontaneous emission (ASE) signal. Amplifiers 74a-b may be adjusted until the voltages detected from detectors 72a-b are substantially equivalent.

Voltage monitor 76 monitors the voltage of the amplified current. The voltage changes even if the signal has the same optical power. A change in voltage indicates wavelength dispersion variation. Voltage monitor 76 instructs dispersion compensator 60 through electrical feedback 78 to compensate for the dispersion in accordance with the monitored dispersion variation.

Modifications, additions, or omissions may be made to dispersion compensation system 50 without departing from the scope of the invention. The components of dispersion compensation system 50 may be integrated or separated according to particular needs. Moreover, the operations of dispersion compensation system 50 may be performed by more, fewer, or other components.

Figure 4:
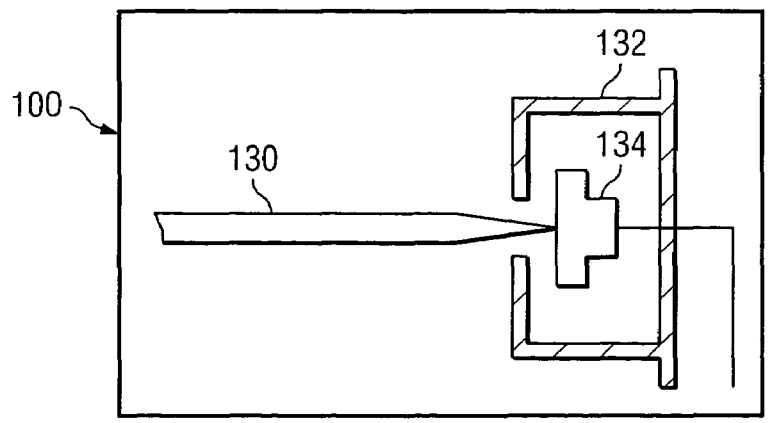
FIG. 4 is a block diagram illustrating one embodiment of a detector that may be used with the dispersion compensation system of FIG. 3.

FIG. 4 is a block diagram illustrating one embodiment of a detector system 100 of dispersion variation monitor 66 of FIG. 3. According to the illustrated embodiment, detector system 100 includes a fiber 130 and a detector 132 with detector material 134 arranged as shown. Fiber 130 may comprise an optical fiber operable to focus the signal towards detector material 134. Detector 132 and detector material 134 may be substantially similar to that of FIG. 2.

Modifications, additions, or omissions may be made to detector 72 without departing from the scope of the invention. The components of detector 72 may be integrated or separated according to particular needs. Moreover, the operations of detector 72 may be performed by more, fewer, or other components.

Certain embodiments of the invention may provide one or more technical advantages. A technical advantage of one embodiment may be that a dispersion variation monitor monitors wavelength dispersion variation of a signal in accordance with photon absorption. The dispersion variation monitor includes polarization dependence reduction features that reduce polarization dependence. The features may split an optical signal into a first polarized signal having first photons and a second polarized signal having second photons. A first current produced by a first material in response to receiving the first photons and a second current produced by a second material in response to receiving the second photons are monitored. The features may reduce polarization dependence.

While this disclosure has been described in terms of certain embodiments and generally associated methods, alterations and permutations of the embodiments and methods will be apparent to those skilled in the art. Accordingly, the above description of example embodiments does not constrain this disclosure. Other changes, substitutions, and alterations are also possible without departing from the spirit and scope of this disclosure, as defined by the following claims.

What is claimed is:

1. A method for reducing polarization dependence of a dispersion variation monitor, comprising:

receiving an optical signal at a monitor, the optical signal comprising a plurality of components;

splitting at a splitter the optical signal into a first polarized signal and a second polarized signal, the first polarized signal comprising a plurality of first photons, the second polarized signal comprising a plurality of second photons;

receiving the plurality of first photons at a first material of a first detector, the first material having a band gap energy greater than or equal to a photon energy and less than or equal to two times the photon energy and operable to produce a reaction in response to two-photon absorption;

receiving the plurality of second photons at a second material of a second detector, the second material also having a band gap energy greater than or equal to a photon energy and less than or equal to two times the photon energy and operable to produce a reaction in response to two-photon absorption;

monitoring a first current resulting from two-photon absorption at the first material in response to receiving the plurality of first photons;

monitoring a second current resulting from two-photon absorption at the second material in response to receiving the plurality of second photons; and establishing whether there is wavelength dispersion variation among the plurality of components in accordance with the first current and the second current by:

determining if there is a change in a normalized current generated from the first current and the second current; and establishing that there is wavelength dispersion variation if there is a change in the normalized current.

2. The method of claim 1, wherein establishing whether there is wavelength dispersion variation among the plurality of components in accordance with the first current and the second current further comprises:

determining a normalized current from the first current and the second current.

3. The method of claim 1, wherein establishing whether there is wavelength dispersion variation among the plurality of components in accordance with the first current and the second current further comprises:

determining a square root of a product of the first current and the second current to yield a first value;

determining a product of two and the first value to yield a second value; and determining a sum of the first current, the second current, and the second value to yield a normalized current.

4. The method of claim 1, further comprising:
amplifying the first current to compensate for a difference in a first conversion efficiency of the first detector and a second conversion efficiency of the second detector.

5. The method of claim 1, further comprising calibrating the monitor by:
receiving a calibrating signal at the monitor;
splitting the calibrating signal into a first calibrating component and a second calibrating component;
receiving the first calibrating component at the first material;
receiving the second calibrating component at the second material;
monitoring a first calibrating current produced by the first material in response to receiving the first calibrating component;
monitoring a second calibrating current produced by the second material in response to receiving the second calibrating component; and
adjusting amplification of the first calibrating current and the second calibrating current until a first voltage of the first calibrating current and a second voltage of the second calibrating current are substantially equivalent.

6. The method of claim 1, wherein the first material has a band gap energy corresponding to a photon energy of the predetermined number of photons.

7. The method of claim 1, wherein the first material is operable to:
generate an electron hole-pair if the predetermined number of photons are received at substantially the same time; and
fail to generate the electron hole-pair if the predetermined number of photons are not received at substantially the same time.

8. The method of claim 1, further comprising:
transmitting the first polarized signal from the splitter to the first detector using a first polarization maintaining fiber; and
transmitting the second polarized signal from the splitter to the second detector using a second polarization maintaining fiber.

9. A system for reducing polarization dependence of a dispersion variation monitor, comprising:
a splitter operable to:
receive an optical signal, the optical signal comprising a plurality of components; and
split the optical signal into a first polarized signal and a second polarized signal, the first polarized signal comprising a plurality of first photons, the second polarized signal comprising a plurality of second photons;
a first detector coupled to the splitter, the first detector comprising a first material having a band gap energy greater than or equal to a photon energy and less than or equal to two times the photon energy and operable to:
receive the plurality of first photons; and
produce a reaction in response to two-photon absorption;
a second detector coupled to the splitter, the second detector comprising a second material having a band gap energy greater than or equal to a photon energy and less than or equal to two times the photon energy and operable to:
receive the plurality of second photons, the second material also operable to produce a reaction in response to two-photon absorption;
a current monitor coupled to the first detector and the second detector, and operable to:
monitor a first current resulting from two-photon absorption at the first material in response to receiving the plurality of first photons;
monitor a second current resulting from two-photon absorption at the second material in response to receiving the plurality of second photons; and
establish whether there is wavelength dispersion variation among the plurality of components in accordance with the first current and the second current by:
determining if there is a change in a normalized current generated from the first current and the second current; and
establishing that there is wavelength dispersion variation if there is a change in the normalized current.

10. The system of claim 9, wherein the monitor is further operable to establish whether there is wavelength dispersion variation among the plurality of components in accordance with the first current and the second current by:
determining a normalized current from the first current and the second current.

11. The system of claim 9, wherein the monitor is further operable to establish whether there is wavelength dispersion variation among the plurality of components in accordance with the first current and the second current by:
determining a square root of a product of the first current and the second current to yield a first value;
determining a product of two and the first value to yield a second value; and
determining a sum of the first current, the second current, and the second value to yield a normalized current.

12. The system of claim 9, wherein the monitor is further operable to establish whether there is wavelength dispersion variation among the plurality of components in accordance with the first current and the second current by:
determining if there is a change in a normalized current generated from the first current and the second current; and
establishing that there is wavelength dispersion variation if there is a change.

13. The system of claim 9, further comprising:
an amplifier operable to amplify the first current to compensate for a difference in a first conversion efficiency of the first detector and a second conversion efficiency of the second detector.

14. The system of claim 9, wherein:
the splitter is further operable to:
receive a calibrating signal; and
split the calibrating signal into a first calibrating signal and a second calibrating signal;
the first detector is further operable to:
receive the first calibrating signal at the first material;
the second detector is further operable to:
receive the second calibrating signal at the second material; and
the monitor is further operable to:

monitor a first calibrating current produced by the first material in response to receiving the first calibrating signal;

monitor a second calibrating current produced by the second material in response to receiving the second calibrating signal; and adjust amplification of the first calibrating current and the second calibrating current until a first voltage of the first calibrating current and a second voltage of the second calibrating current are substantially equivalent.

15. The system of claim 9, wherein the first material has a band gap energy corresponding to a photon energy of the predetermined number of photons.

16. The system of claim 9, wherein the first material is operable to:

generate an electron hole-pair if the predetermined number of photons are received at substantially the same time; and fail to generate the electron hole-pair if the predetermined number of photons are not received at substantially the same time.

17. The system of claim 9, further comprising:

a first polarization maintaining fiber operable to transmit the first polarized signal from the splitter to the first detector; and a second polarization maintaining fiber operable to transmit the second polarized signal from the splitter to the second detector.

18. A system for reducing polarization dependence of a dispersion variation monitor, comprising:

means for receiving an optical signal at a monitor, the optical signal comprising a plurality of components;

means for splitting at a splitter the optical signal into a first polarized signal and a second polarized signal, the first polarized signal comprising a plurality of first photons, the second polarized signal comprising a plurality of second photons;

means for receiving the plurality of first photons at a first material of a first detector, the first material having a band gap energy greater than or equal to a photon energy and less than or equal to two times the photon energy and operable to produce a reaction in response to two-photon absorption;

means for receiving the plurality of second photons at a second material of a second detector, the second material also having a band gap energy greater than or equal to a photon energy and less than or equal to two times the photon energy and operable to produce a reaction in response to two-photon absorption;

means for monitoring a first current resulting from two-photon absorption at the first material in response to receiving the plurality of first photons;

means for monitoring a second current resulting from two-photon absorption at the second material in response to receiving the plurality of second photons; and means for establishing whether there is wavelength dispersion variation among the plurality of components in accordance with the first current and the second current by:

determining if there is a change in a normalized current generated from the first current and the second current; and establishing that there is wavelength dispersion variation if there is a change in the normalized current.

19. A method for reducing polarization dependence of a dispersion variation monitor, comprising:

receiving an optical signal at a monitor, the optical signal comprising a plurality of components;

splitting at a splitter the optical signal into a first polarized signal and a second polarized signal, the first polarized signal comprising a plurality of first photons, the second polarized signal comprising a plurality of second photons;

transmitting the first polarized signal from the splitter using a first polarization maintaining fiber;

transmitting the second polarized signal from the splitter using a second polarization maintaining fiber;

receiving the plurality of first photons at a first material of a first detector, the first material having a band gap energy corresponding to a photon energy of the predetermined number of photons, the first material having a band gap energy greater than or equal to a photon energy and less than or equal to two times the photon energy and operable to produce a reaction in response to two-photon absorption, the first material is operable to:

generate an electron hole-pair if the predetermined number of photons are received at substantially the same time; and fail to generate the electron hole-pair if the predetermined number of photons are not received at substantially the same time;

receiving the plurality of second photons at a second material of a second detector, the second material also having a band gap energy greater than or equal to a photon energy and less than or equal to two times the photon energy and operable to produce a reaction in response to two-photon absorption;

amplifying the first current to compensate for a difference in a first conversion efficiency of the first detector and a second conversion efficiency of the second detector;

monitoring a first current resulting from two-photon absorption at the first material in response to receiving the plurality of first photons;

monitoring a second current resulting from two-photon absorption at the second material in response to receiving the plurality of second photons;

establishing whether there is wavelength dispersion variation among the plurality of components in accordance with the first current and the second current, establishing whether there is wavelength dispersion variation further comprising:

determining a square root of a product of the first current and the second current to yield a first value;

determining a product of two and the first value to yield a second value;

determining a sum of the first current, the second current, and the second value to yield a normalized current;

determining if there is a change in a normalized current generated from the first current and the second current; and establishing that there is wavelength dispersion variation if there is a change in the normalized current; and calibrating the monitor by:

receiving a calibrating signal at the monitor;
splitting the calibrating signal into a first calibrating signal and a second calibrating signal;
receiving the first calibrating signal at the first material;
receiving the second calibrating signal at the second material;
monitoring a first calibrating current produced by the first material in response to receiving the first calibrating signal;
monitoring a second calibrating current produced by the second material in response to receiving the second calibrating signal; and
adjusting amplification of the first calibrating current and the second calibrating current until a first voltage of the first calibrating current and a second voltage of the second calibrating current are substantially equivalent.

* * * * *